United States Patent Office 3,330,807
Patented July 11, 1967

3,330,807
METHOD OF PREPARING SUPERHIGH-MOLECULAR EPOXIDE RESINS
Ivo Wiesner, 480/8 Kosmonautu, Usti nad Labem, Czechoslovakia
No Drawing. Filed Apr. 7, 1965, Ser. No. 446,380
Claims priority, application Czechoslovakia, Apr. 13, 1964, 2,121/64
9 Claims. (Cl. 260—47)

This invention relates to superhigh-molecular weight epoxide resins and a method of preparing the same by a catalytic polyaddition reaction.

High molecular weight epoxide resins are of great interest as intermediate products for the preparation of paints of unusual qualities. This applies particularly to the epoxide esters and combinations thereof with amino-aldehyde and phenol-aldehyde condensation products. Coatings formed of these high molecular weight epoxide resins are characterized by excellent mechanical and electrical properties, high gloss and resistance to corrosive media. The high molecular epoxide resins used for this purpose have an average molecular weight between 5,000 and 8,000 $\overline{M}_w$.

More recently, epoxide resins have also appeared on the market with an average molecular weight between 50,000 and 300,000. These may already be considered as in the range of the so-called superhigh-molecular weight epoxide resins. Resins in this range of molecular weights have outstanding properties as lacquer components even though they may be in uncured and unmodified condition. It appears that the quality of the coating film formed with these resins constitutes a substantial improvement over all heretofore known paint compositions.

The conventional methods for preparing epoxide resins irrespective of the high molecular weight usually start from the raw materials common in epoxide resin manufacture, such as epichlorohydrine, diane, alkali metal hydroxides, and they proceed along the usual polymerization methods such as pearl (suspension) polycondensation of epichlorohydrine, with dianate.

These methods unfortunately are quite complex and require a time-consuming preparation. They also result in relatively high losses of epichlorohydrine and the chance to reach a maximum molecular weight of 50,000 $\overline{M}_w$ is quite limited.

Theoretically the presently known methods of preparing high molecular weight epoxide resins can be used with certain modifications also for the products in the superhigh-molecular weight range. Among these methods is the polyaddition reaction between diepoxide component and bisphenol. This polyaddition reaction is usually carried out in solution and with lithium, sodium or ammonium salts as catalysts. The difficulty with these methods is the requirement of a very high reaction temperature, that is, about 200° C. which in particular is apt to impair the color of the product obtained.

It is therefore an object of the present invention to provide a superhigh-molecular weight resin which can be made in a relatively simple and industrially acceptable mass production process.

Another general object of the present invention is to provide for a resin of this type which can be made from relatively low cost raw materials and in a relatively inexpensive process.

A more specific object of the invention is to provide for a high molecular weight resin of the type indicated which can be made in processes acceptable in modern factory procedures without requiring extremely high temperatures which may hurt the properties of the product.

Under another angle, it is an object of the present invention to provide for a simplified and low cost continuous reaction process for making the substituted dimethyl methane which will be more specifically defined presently.

These and other objects of the invention will appear from the following description.

According to the process of the invention superhigh-molecular weight epoxide resins are prepared by subjecting (4-epoxypropoxyphenyl-4'-hydroxyphenyl) dimethyl methane to a polyaddition reaction which is carried out with the product being dissolved in an inert solvent or a mixture of such solvents at an elevated temperature and in the presence of a catalyst. The temperature preferably is between 80 and 160° C. and the preferred catalysts are nitrogenous compounds and lithium or sodium compounds. If a nitrogenous catalyst is used the preferred range is between .05 and 5%. With the lithium and sodium compounds the preferred range is between .001 and .1%. The solution is first brought up to the polyaddition temperature while in an inert atmosphere; the necessary amount of catalyst is then added and the course of the proceeding reaction is continuously watched by means of measurements of the viscosity or of the dielectric constant or conductivity. After completion of the reaction a portion of the solvent is withdrawn by vacuum distillation and a solution of the residue having the desired viscosity is formed by adding a suitable solvent such as xylene or diacetone. It is also possible to cool down the reaction mixture without removing part of the solvent until it has reached room temperature whereupon the reaction mixture may be used for lacquer compositions without further treatment.

As inert solvents there may be used for instance higher ketones, aromatic hydrocarbons, secondary and tertiary alcohols, esters, ether-acetates, dimethyl formamide, dimethyl sulfoxide, or mixtures thereof.

Examples of nitrogenous compounds which may be used as catalysts are tertiary amines of a dissociation constant of $10^{-3}$ to $10^{-8}$, benzyl-dialkyl amines, alkylated piperidine, halides of quaternary bases, or medium basic ion-exchangers. Examples of lithium and sodium compounds which may likewise be used as catalysts are the chlorides, carbonates, acetates or hydroxides of these metals.

The final products are evaluated by determining their limit viscosity or the transition point of the II$^{nd}$ order or the degree of polydispersity.

Since the (4-epoxypropoxyphenyl-4'-hydroxyphenyl) dimethyl methane comprises in its molecule both an epoxide and a phenolic group, the compound by itself will provide accurately the desired ratio $$\frac{\text{epoxy group}}{\text{phenolic group}} = -1,000$$

It is thus possible to avoid the employment of a two-component system such as the system constituted by the diepoxide compound and bis-phenol. This practically excludes errors and weight variations of the different ingredients. It is thus possible to obtain an extremely high molecular weight average in the range between 500,000 and 800,000 which cannot be attained by conventional methods (expressed as $\overline{M}_w$).

The following examples illustrate the invention:

Example 1

500 g. of (4-epoxypropoxyphenyl-4'-hydroxyphenyl) dimethyl methane, 500 g. of rectified anhydrous monobutylglycol ether acetate and 100 g. pure toluene were placed in a 1500 ml. flask which is provided with a stirrer, a thermometer, an inlet for insert gas, a measuring device and a suitable heating attachment. The pressure in the apparatus was then adjusted to 100 mm. Hg and 50–70 g. of the volatile components were distilled off together with the occluded moisture. The pressure was thereupon readjusted to atmospheric level by introducing an inert gas and the reaction mixture was then brought up to 120° C. whereupon 3.0 g. benzyldiethyl amine was added. The changes in conductivity were being closely watched during the reaction while the stated temperature was being maintained. As soon as the conductivity changes no longer exceeded the standard measuring error, which was in about 5 to 6 hours, the reaction mixture was cooled down to room temperature and the concentration of the solution was reduced to 40% by the addition of pure xylene. The volatile components were then removed from the product by means of distillation from the film through use of a high vacuum. The vapor tension and the transition point of II$^{nd}$ order were then determined for the final product. The transition point was found to be between 145 and 150° C.

Example 2

Using the same apparatus as described in Example 1 500 g. of (4-epoxypropoxyphenyl-4'-hydroxyphenyl) dimethyl methane and 700 g. of pure methyl-isobutyl ketone were placed in a flask. After about 100 g. of the solvent had been distilled off 35 g. of an ion-exchange compound which had been swollen in the same kind of solvent were added, the last stated weight being based on the dry material of the exchange compound. As the exchanger there was used the reaction product of epichlorohydrine and diethylene triamine. The reaction mixture was heated in an inert atmosphere until it boiled and the reaction was permitted to continue for 6 hours. After cooling down, 50 g. of diacetone alcohol and 60 g. xylene were added. The ion-exchange compound was filtered off and a sample was taken to determine the transition point. This point was found to be between 102 and 106° C.

Example 3

In the flask of the apparatus as in Example 1 500 g. of (4-epoxypropoxyphenyl-4'-hydroxyphenyl) dimethyl methane and 700 g. of a mixture consisting of 400 g. pure cyclohexanone and 300 g. pure xylene were placed. About 100 g. of the solvent was distilled off at a reduced pressure and the reaction mixture was heated to 130° C. in an inert atmosphere. Thereupon 0.08 g. of finely powdered anhydrous lithium carbonate was added. The reaction was allowed to proceed at the stated temperature and the course of the reaction was closely watched by means of measurements of the conductivity. The reaction was completed after 4 to 5 hours. The transition point of the II$^{nd}$ order was found to be between 120 and 130° C.

Example 4

500 g. of (4-epoxypropoxyphenyl-4'-hydroxyphenyl) dimethyl methane and 400 g. pure xylene and 300 g. tert. amyl alcohol were placed in the flask of the apparatus employed in Example 1. After distilling off about 200 g. of the solvent, 2.8 g. N-benzyl piperidine was added and the mixture was permitted to react in an inert atmosphere at a temperature of 125° C. for a time of 4½ to 5 hours. The limit viscosity value was determined to be 0.52 (in dimethyl formamide).

Example 5

Using again the apparatus of Example 1 500 g. of (4-epoxy-propoxyphenyl-4'-hydroxyphenyl) dimethyl methane, 500 g. ethyl benzene and 300 g. tert. amyl alcohol were placed in the flask. After distilling off about 250 g. of the solvent 0.06 g. of anhydrous sodium carbonate was added and the reaction mixture was allowed to condense at 125° C. for 8 hours under an atmosphere of nitrogen. The limit viscosity value was found to be 0.49 (dimethyl formamide).

While the invention has been explained above and while I have given examples illustrating various aspects of the invention, I do not wish to be limited otherwise than by the language of the appended claims.

What is claimed as new and desired o be secured by Letters Patent is:

1. A method of preparing superhigh-molecular weight epoxide resins comprising the step of subjecting (4-epoxypropoxyphenyl-4'-hydroxyphenyl) dimethyl methane to a polyaddition reaction while the compound is in solution in an inert solvent, the reaction being effected at elevated temperature and in the presence of a catalyst, and comprising the step of recovering the superhigh-molecular weight epoxide resin from the solution.

2. The process of claim 1 wherein the inert solvent is a member selected from the group consisting of higher ketones, aromatic hydrocarbons, secondary alcohols, tertiary alcohols, esters, ether acetates, dimethyl formamide, dimethyl sulfoxide and mixtures of these compounds.

3. The process of preparing superhigh-molecular weight epoxide resins comprising dissolving (4-epoxypropoxyphenyl-4'-hydroxyphenyl) dimethyl methane in an inert solvent and heating the solution to between 80 and 160° C. in the presence of a nitrogenous compound in catalytic amounts followed by recovery of the polymer from the solution.

4. The process of claim 3 wherein the nitrogenous compound is a member selected from the group consisting of tertiary amines having a dissociation constant of $10^{-3}$ to $10^{-8}$, benzyldialkyl amines, alkylated piperidine, halides of quaternary bases, and medium basic ion-exchangers.

5. The process of preparing superhigh-molecular weight epoxide resins comprising dissolving (4-epoxypropoxyphenyl-4'-hydroxyphenyl) dimethyl methane in an inert solvent and heating the solution to between 80 and 160° C. in the presence of a catalyst constituted by a member selected from the group consisting of lithium and sodium compounds followed by recovery of the polymer from the solution.

6. The process of preparing superhigh-molecular weight epoxide resins comprising dissolving (4-epoxypropoxyphenyl-4'-hydroxyphenyl) dimethyl methane in an inert solvent and heating the solution to an elevated temperature in the presence of a catalyst constituted by a member selected from the group consisting of lithium chlorides, lithium carbonates, lithium acetates, lithium hydroxides, sodium chlorides, sodium carbonates, sodium acetates and sodium hydroxides, followed by recovery of the polymer from the solution.

7. The method of preparing superhigh-molecular weight epoxide resins comprising the step of subjecting (4-epoxypropoxyphenyl - 4' - hydroxyphenyl) dimethyl methane to a polyaddition reaction while in solution in an inert solvent, the reaction being effected at an elevated temperature and in the presence of a nitrogenous compound in an amount of 0.05 to 5% followed by recovery of the polymer from the solution.

8. The method of preparing superhigh-molecular weight epoxide resins comprising the step of subjecting (4-epoxypropoxyphenyl-4'-hydroxyphenyl) dimethyl methane to a polyaddition reaction while in solution in an inert solvent, the reaction being effected at an elevated temperature and in the presence of a lithium compound in an amount of 0.001 to 0.1% followed by recovery of the polymer from the solution.

9. The method of preparing superhigh-molecular weight epoxide resins comprising the step of subjecting (4-epoxypropoxyphenyl-4'-hydroxyphenyl) dimethyl methane to a polyaddition reaction while in solution in an inert solvent, the reaction being effected at an elevated temperature and in the presence of a sodium compound in an amount of 0.001 to 0.1% followed by recovery of the polymer from the solution.

References Cited

UNITED STATES PATENTS 3,177,090  4/1965  Bayes et al. _____ 260—47 X

WILLIAM H. SHORT, *Primary Examiner.*

T. D. KERWIN, *Assistant Examiner.*